J. B. HERSHEY.
HOG FEEDER.
APPLICATION FILED NOV. 30, 1914.
1,141,059.
Patented May 25, 1915.
2 SHEETS—SHEET 1.
FIG. I
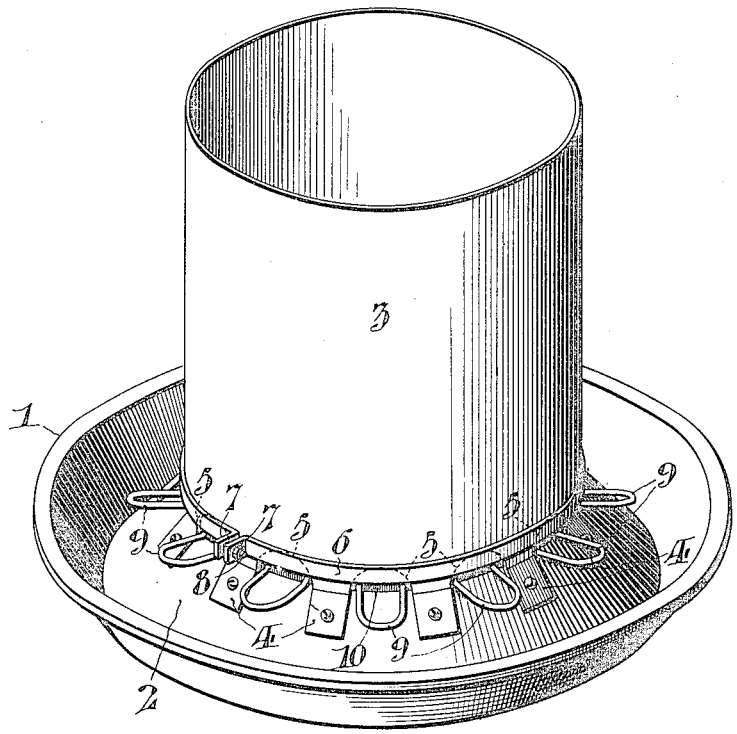
FIG. IV
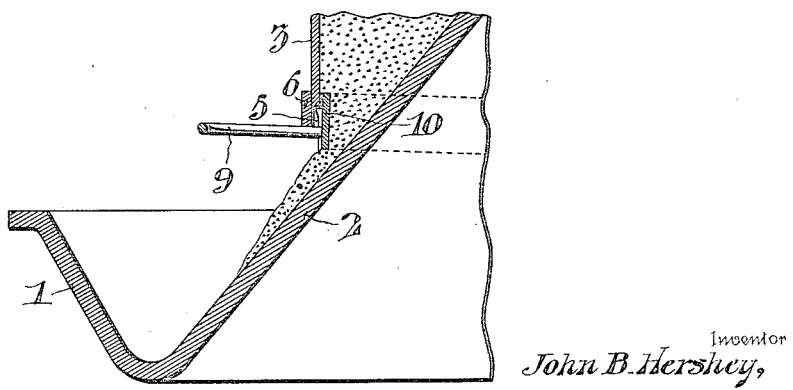
Inventor
John B. Hershey,

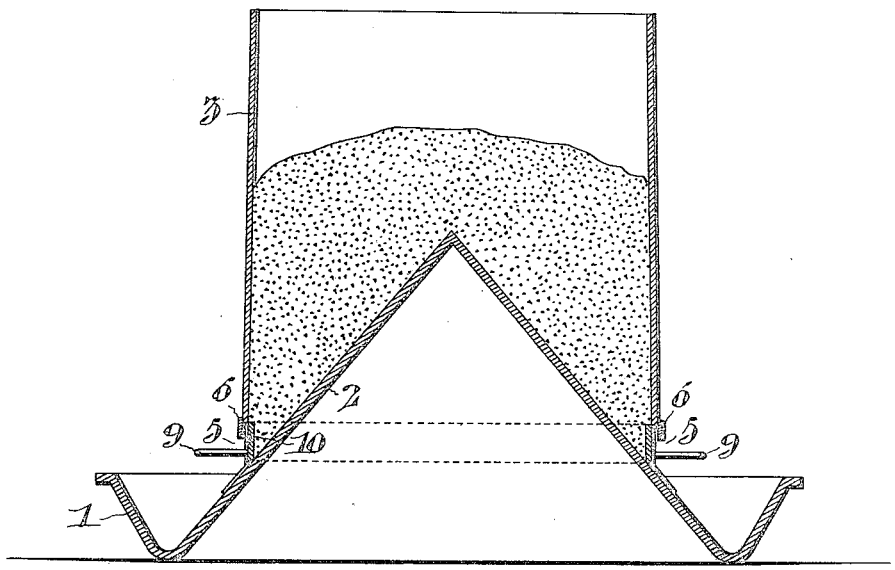
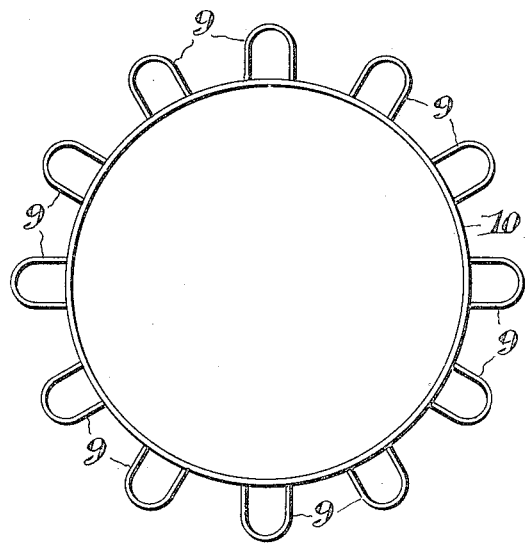

UNITED STATES PATENT OFFICE.

JOHN B. HERSHEY, OF MANHEIM, PENNSYLVANIA, ASSIGNOR TO THE HERSHEY MACHINE & FOUNDRY CO., OF MANHEIM, PENNSYLVANIA, A CORPORATION OF PENNSYLVANIA.

HOG-FEEDER.

1,141,059.  Specification of Letters Patent.  Patented May 25, 1915.

Application filed November 30, 1914. Serial No. 874,584.

*To all whom it may concern:*

Be it known that I, JOHN B. HERSHEY, residing at Manheim, in the county of Lancaster and State of Pennsylvania, have invented certain new and useful Improvements in Hog-Feeders, whereof the following is a specification, reference being had to the accompanying drawings.

My invention relates to a hog feeder comprising a magazine or receptacle with a trough at the foot thereof which is fed from the receptacle.

According to my invention apertures, by means of which food passes from the receptacle to the trough, are protected by a vertically sliding closure secured to which are suitable projections which I term rooters, whereby the flow of food from the receptacle to the trough is automatically taken care of by the snout of the feeding animal, which when it elevates the rooter raises the closure and permits more food to flow into the trough.

In the accompanying drawings, I have illustrated a feeder embodying my invention, in which—

Figure I, is a perspective view of such a feeder. Fig. II, is a vertical central section through the same. Fig. III, is a plan view of the " root " ring, by which the flow of the food from the feeder is controlled. Fig. IV, is an enlarged partial sectional view, showing the root ring in raised position.

The trough 1, is conveniently formed in circular form with a central cone 2. Over the cone is mounted the receptacle 3, which is substantially cylindrical in form, the diameter at the top being very slightly less than that of the bottom, thereby giving a slight inclination to the side wall, which obviates any sticking of the food thereto and also tends to facilitate the flow of the food from the receptacle. The lower edge of the receptacle is provided with feet 4, attached to the sloping sides of the cone 2. Between the feet 4, the lower edge of the receptacle is cut away in sections 5, each of said sections providing an aperture sufficiently large to permit the free flow of food therethrough from the receptacle into the trough. These apertures are subject to both permanent and automatic control as follows:—

Permanent control of the apertures is necessary in order to adapt the feeder to any kind of food with which it is proposed to supply the receptacle. Thus, for example, if hominy or corn be placed within the receptacle, the openings may be rendered comparatively small so as to prevent any wasteful flow of the food. This is accomplished by the regulating ring 6, which surrounds the lower end of the receptacle. It is a split ring provided at its extremities with lugs 7, united by a bolt 8, by means of which it may be permanently adjusted at any desired height, so as to cut off so much of the top of each aperture as may be required.

The automatic control of the apertures is accomplished by a ring 10, which I term a root ring. It is placed within the receptacle with its lower edge resting on the inclined sides of the cone 2, immediately within the openings. Attached to this root ring are rooters 9, one projecting through each of the apertures of the receptacle. I prefer to make these rooters in the form of a half-ring of iron projecting horizontally from the outer surface of the root ring. They project far enough to encounter the snout of a hog when he raises it from the trough to the position shown in Fig. IV. The hog soon learns that by thus raising the rooter he permits a fresh supply of food to run into the trough.

By the use of the feeder which I have thus described, I am enabled to use a large receptacle which need only be filled at comparatively long intervals, from which the animals are able to obtain food as they desire it with adequate protection to prevent any wasteful flow of the food from the receptacle to the trough.

Having thus described my invention, I claim:

1. In an article of the class described, the combination of a substantially cylindrical receptacle, a trough surrounding said receptacle, a series of apertures leading from the receptacle to the trough, a single vertically sliding ring constituting a closure controlling said apertures, and means projecting from the ring over the trough, whereby the snout of the animal feeding may raise the closure to permit the further flow of food from the receptacle to the trough.

2. The combination in a hog feeder, of a circular trough, a substantially cylindrical receptacle of increasing diameter from top to bottom, surmounting the trough, a series of apertures leading from the bottom of the receptacle to the trough, a vertically sliding ring surrounding said apertures, and rooters projecting from said ring over the trough as and for the purposes described.

3. The combination in a hog feeder, of a circular trough, a substantially cylindrical receptacle surmounting the trough, a series of apertures leading from the receptacle to the trough, a vertically sliding ring surrounding said apertures, rooters projecting horizontally from said ring, one through each aperture of the receptacle, as and for the purpose described.

4. The combination in an article of the class described of a circular trough with a central cone, a substantially cylindrical receptacle surmounting the trough, a series of apertures leading from the bottom of the receptacle to the trough, a regulating ring on one surface of the receptacle, and a vertically sliding ring on the other surface of the receptacle with projections whereby the latter ring may be raised by the snout of an animal feeding from the trough.

In testimony whereof, I have hereunto signed my name, at Manheim, Penna., this 25th day of November 1914.

JOHN B. HERSHEY.

Witnesses:
H. E. TROUT,
J. H. NISSLEY.

Copies of this patent may be obtained for five cents each, by addressing the "Commissioner of Patents, Washington, D. C."